Patented Nov. 23, 1926.

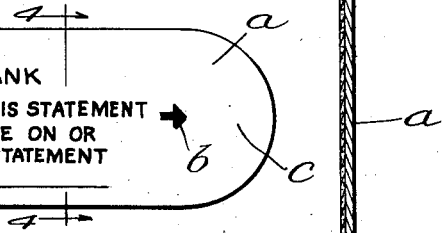

1,608,294

UNITED STATES PATENT OFFICE.

LYNN W. BEMAN, OF CHICAGO, ILLINOIS.

COMBINATION BILL BANK CHECK.

Application filed December 12, 1925. Serial No. 74,933.

This invention relates to the commercial banking fields and its object is to reduce and to a large extent do away with the labor of writing out a bank check for each commercial bill or statement which is to be paid.

The invention consists in a safe means, easily constructible and usable for converting the bill or statement rendered, which is to be paid, into a bank check, the only writing required in connection therewith being the signature of the drawer of the check.

The invention further consists in such a means automatically preventing alteration in the amount directed to be paid.

Still further, the invention consists in numerous features and details of construction hereafter more fully set forth in the specification and claims.

Referring to the drawings in which like numerals represent the same parts throughout the several views:

Figure 1 is a face view of the bill or statement which is to be paid.

Figure 2 is a face view of the check proper, as it comes from the printers and before its application to the bill of Figure 1.

Figure 3 is a face view of the combined bill-check as it is sent to the bank for payment.

Figure 4 is a sectional, detail view on the line 4—4 of Figure 2.

For the purposes of illustrating this invention, an entirely fictitious named dairy company: "Bowden Dairy Co." is supposed to have rendered to one John Doe the bill of Fig. 1 showing a net amount of $3.44 to be paid. Under the ordinary principle of paying this bill, John Doe would have to take an ordinary check blank, date it, fill in the name of Bowden Dairy Co., write the words: "Three and 44/100 dollars" in words in one part of the check and the numerals: "$3.44" in another part of the check, and finally sign the same.

In carrying out this invention, John Doe does away with all this writing by providing the printed machine numbered check blank $a$ of Figure 2, having on its left hand portion directions to the bank to pay the amount indicated by the statement, near its right hand edge an arrow $b$, adapted to point to the amount to be paid and at the right of the arrow, the blank space $c$ wherein the amount to be paid, $3.44, can appear through the thin, transparent material of the check $a$. These check blanks $a$ are preferably gummed on the reverse side so that each one may be pasted onto the bill which is to be paid. In the case of the particular bill shown, John Doe takes one of his checks, moistens the paste or glue on the reverse side of the check, applies it as shown in Figure 3, with the arrow $b$ pointing directly to the numerals 3.44 which are to be paid. Having applied the check $a$ to the bill $d$, John Doe signs his name and the check is complete, ready for transmission to the Bowden Dairy Co. and transmission by it to the designated bank for payment,—in the particular case here illustrated, the fictitious "First National Bank". The paper or other material on which check $a$ is printed being thin, the numerals 3.44 are readily readable through the check $a$ when applied to the bill $d$ and it is impossible for anybody to remove the paper of check $a$ from over numerals 3.44 and alter those numerals without its being instantly detected by anyone handling the bill-check after such alteration.

The check $a$ may be made of forgery proof paper and equipped with designating and signifying numerals as for instance those appearing in the lower left hand corner of the check just like any other check issued by a bank for the use of its customers, whereby, when the check has been applied to the bill as shown and signed by the drawer of the check, substantially all the protection of the modern bank check is obtained,—this while dispensing with the labor and time of writing out a detailed check for each bill, an amount of time which becomes very clearly apparent when anyone writes a dozen or so checks at one sitting.

One advantage of the device is that it automatically returns all original invoices to the payer and thus leads to his preserving them for a time at least, thereby assisting in budget making even in family use where no books are kept.

Having thus described my invention, what I claim as new and desire to secure by Letters Patent is:

1. In combination, a bill, a check, means for securing the bill and check together, and means included in the check whereby the bill designates on the check the amount to be paid by the latter.

2. In combination, a bill, a check, means for securing the bill and check together with the check overlying and thereby protecting against alteration the amount to be paid appearing on the bill, and means included in the check whereby the bill designates on the check the amount to be paid by the check.

3. In combination, a bill, a transparent check, and means for securing the bill and check together with the check overlying the amount to be paid appearing on the bill, whereby the bill designates on the check the amount to be paid by the check and whereby the amount to be paid appearing on the bill is protected by the check against alteration.

4. As an article of manufacture, a combined bill and bank check made up of two sheets of material one containing the name of the payee and the amount to be paid and not containing the directions for payment or the drawer's signature, the other containing the directions for payment and the drawer's signature and not containing the name of the payee or the amount to be paid.

5. As an article of manufacture, a combined bill and bank check made up of two sheets of material, one containing the name of the payee and the amount to be paid, the other containing the directions for payment and the drawer's signature and means whereby the second sheet protects the amount to be paid appearing on the first sheet against alteration.

6. In combination, a bill, a separate check, and means for securing the bill and check together, the bill containing the name of the payee and the amount to be paid by the check and the check having an appropriately designated space adapting it to receive the drawer's signature and not containing the name of the payee or the amount to be paid.

7. In combination, a bill, and a separate check adapted to be secured to said bill, the check being provided with an appropriately designated space to receive the drawer's signature and not being provided with designated spaces intended to receive the name of the payee or the amount to be paid.

In witness whereof, I have hereunto subscribed my name.

LYNN W. BEMAN.